(12) United States Patent
Zhao

(10) Patent No.: US 7,068,939 B2
(45) Date of Patent: Jun. 27, 2006

(54) DYNAMIC POWER OPTICAL SPLITTER

(75) Inventor: Ximin Zhao, San Jose, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 708 days.

(21) Appl. No.: 10/162,835

(22) Filed: Jun. 4, 2002

(65) Prior Publication Data
US 2003/0223752 A1    Dec. 4, 2003

(51) Int. Cl.
*H04J 14/02* (2006.01)

(52) U.S. Cl. .......................... 398/84; 372/25
(58) Field of Classification Search ............ 398/84
See application file for complete search history.

(56) References Cited

U.S. PATENT DOCUMENTS

| | | | |
|---|---|---|---|
| 5,875,273 A * | 2/1999 | Mizrahi et al. ............ 385/37 |
| 5,892,582 A * | 4/1999 | Bao et al. ................. 356/519 |
| 5,982,791 A * | 11/1999 | Sorin et al. ................. 372/25 |
| 6,303,182 B1 * | 10/2001 | Eggleton et al. ......... 427/163.2 |
| 6,844,212 B1 * | 1/2005 | Bond et al. ................. 438/31 |

* cited by examiner

*Primary Examiner*—David C. Payne
(74) *Attorney, Agent, or Firm*—Wei Te Chung

(57) ABSTRACT

An optical splitter (1) includes a circulator (10) and a dynamic FBG (Fiber Bragg Grating) (20) which can achieve different reflection ratios corresponding to the size of a current in the dynamic FBG. The circulator has three ports. One port ($P_0$) connects with an input optical fiber, one port ($P_3$) connects with the dynamic FBG, and the third port ($P_2$) connects with an output optical fiber. Light input from the circulator to the dynamic FBG and is dynamically split into two beams. One beam is output from an output port ($P_1$) of the dynamic FBG, the other beam is reflected by the dynamic FBG and is output from the output port ($P_2$) of the circulator.

18 Claims, 3 Drawing Sheets

DYNAMIC POWER OPTICAL SPLITTER

BACKGROUND OF THE INVENTION

1. Field of the Invention

The present invention relates to an optical coupler, and particular to a dynamic power optical splitter which integrates a dynamic FBG (Fiber Bragg Grating) and a circulator.

2. Description of Prior Art

Optical couplers are used in optical communication for coupling light from a number of input optical fibers into a number of output optical fibers. An optical splitter is a type of optical coupler wherein the number of output optical fibers is greater than the number of input optical fibers. The power of the input light is split into a plurality of predetermined portions and is output through the output optical fibers.

A conventional method of manufacturing an optical coupler is by fusing bare section of optical fibers together. Bare section of the fibers are placed in contact with each other and the section are heated and drown (placed under tension). This fuses the bare section of the fibers together.

Referring to FIG. 1, U.S. Pat. No. 5,988,892 discloses an optical splitter 3 which includes an input optical fiber 312 and two output optical fibers 314 and 316. A fused portion 318 is formed by heating and drawing the fibers 312, 314 and 316 during formation of the optical splitter 3. Mixed epoxy coverings 320 and 322 cover the interfaces between the fused portion 318 and the unfused portions of optical fibers 312, 314 and 316. The mixed epoxy coverings 320 and 322 are for improving the mechanical strength of the interfaces. Light input from the input optical fiber 312 passes through the fused portion 218 and divides into two beams which are output to the two output optical fibers 314 and 316.

A disadvantage of the above design is that the proportion of the power in the input fiber 312 output to each output fiber 314, 316 is fixed. A dynamic power optical splitter which can dynamically change the relative proportions of light output by the output optical fibers is desired.

SUMMARY OF THE INVENTION

An optical splitter in accordance with the present invention comprises a circulator and a dynamic FBG (Fiber Bragg Grating) which can achieve different reflection ratios corresponding to the size of a current in the dynamic FBG. The circulator has three ports. A first port connects with an input optical fiber, a second port connects with the dynamic FBG and a third port connects with an output optical fiber. Light input from the circulator to the dynamic FBG is dynamically split into two beams. One beam is output from an output port of the dynamic FBG, the other beam is reflected by the dynamic FBG and is output from the third port of the circulator. The power ratio of the two beams (one reflected and one passed) can be controlled by the current passing through the dynamic FBG.

DETAILED DESCRIPTION OF PREFERRED EMBODIMENT

Figure 1:
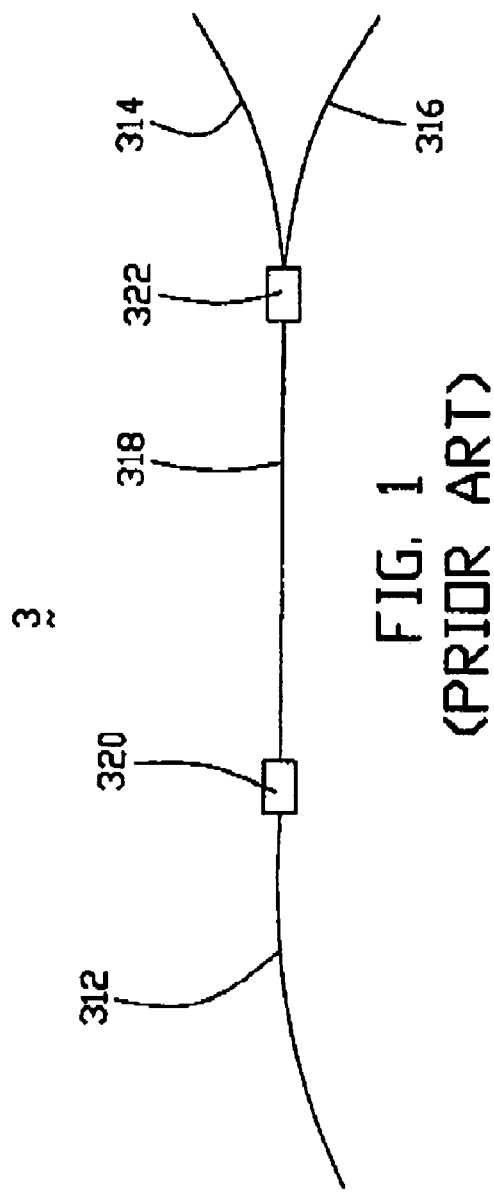
FIG. 1 is a schematic diagram of a conventional optical splitter.
Figure 2:
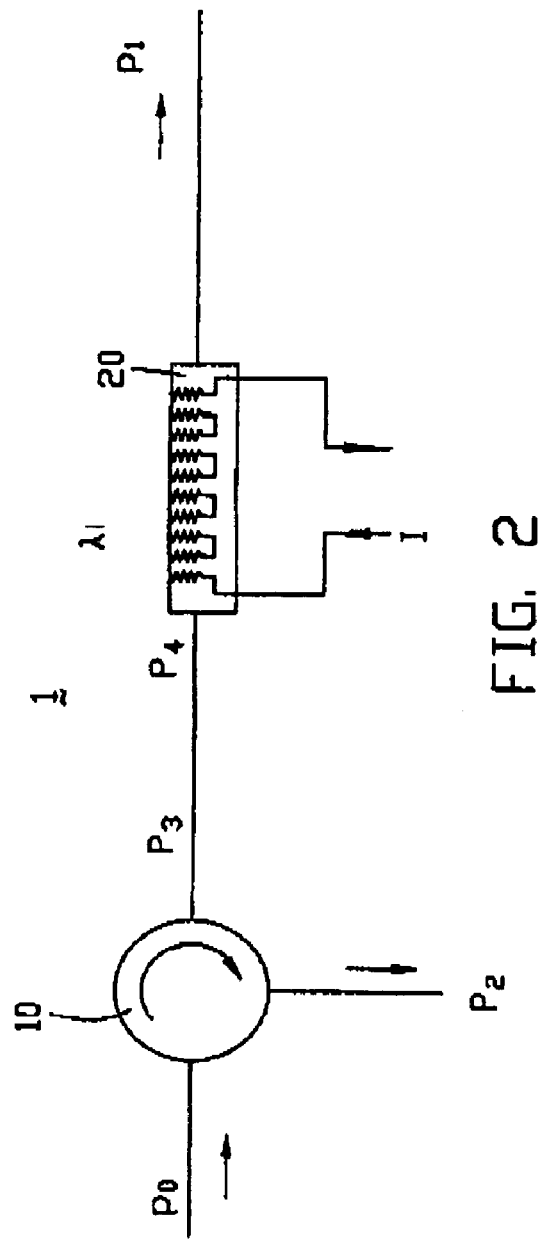
FIG. 2 is a schematic diagram of a dynamic power optical splitter in accordance with the present invention.
Figure 3:
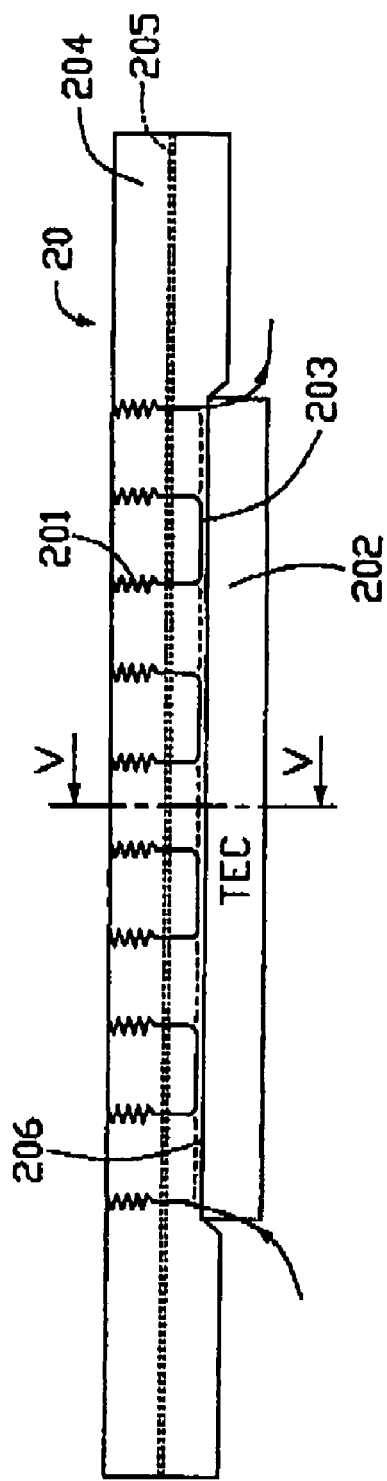
FIG. 3 is a side view of a dynamic FBG of the dynamic power splitter of FIG. 2.
Figure 4:
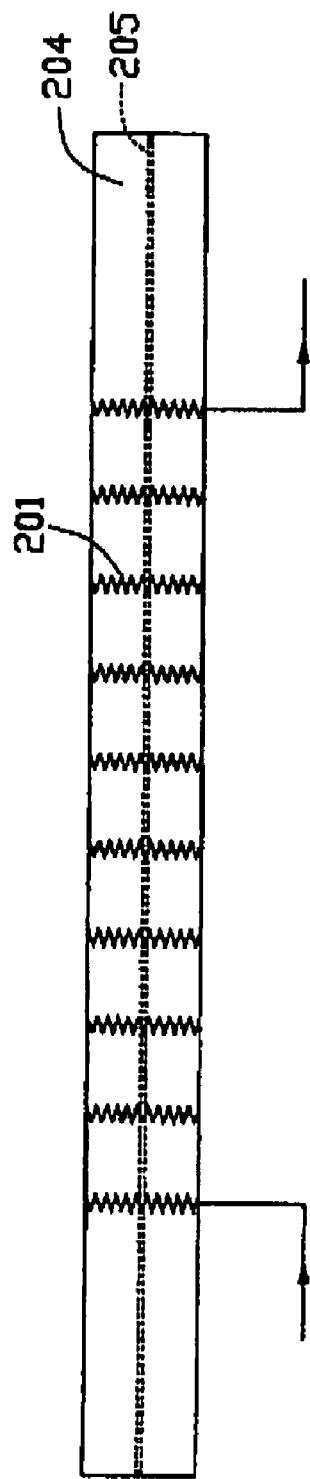
FIG. 4 is a top view of the dynamic FBG of FIG. 3.
Figure 5:
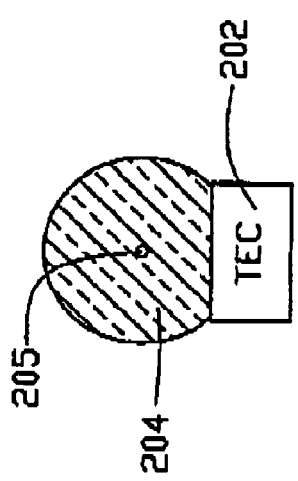
FIG. 5 is a cross sectional view of the dynamic FBG of FIG. 3 taken along line V—V.

Referring to FIG. 2, a dynamic power optical splitter 1 in accordance with the present invention comprises a circulator 10 and a dynamic FBG (Fiber Bragg Grating) 20. The circulator 10 has three ports $P_0$, $P_2$ and $P_3$. Light input to the port $P_0$ outputs from the port $P_3$, while light input to the port $P_3$ outputs from the port $P_2$. The dynamic FBG 20 has two ports $P_1$ and $P_4$. The port $P_4$ connects with the port $P_3$ of the circulator 10. The dynamic FBG 20 exhibits different reflection ratios corresponding to different electrical current I passing through the dynamic FBG 20.

Light input to the port $P_0$ of the circulator 10 outputs from the port $P_3$ and reaches the dynamic FBG 20. When a wavelength $\lambda_i$ of the light incident on the dynamic FBG 20 meets the Bragg condition, that is, is suck that an integer multiple of $\lambda_i/2$ equates a grating period of the dynamic FBG 20, the light is divided into two beams. A portion of the light is reflected and returns to the port $P_3$ of the circulator 10, and is then output from the port $P_2$ of the circulator 10, while another portion of light passes through the dynamic FBG 20 and is output from the port $P_1$ of the dynamic FBG 20. Thus, the light is separated into two beams, and the power proportion of the power of the two beams can be adjusted by adjusting the current I passing through the dynamic FBG 20.

Figure 6:
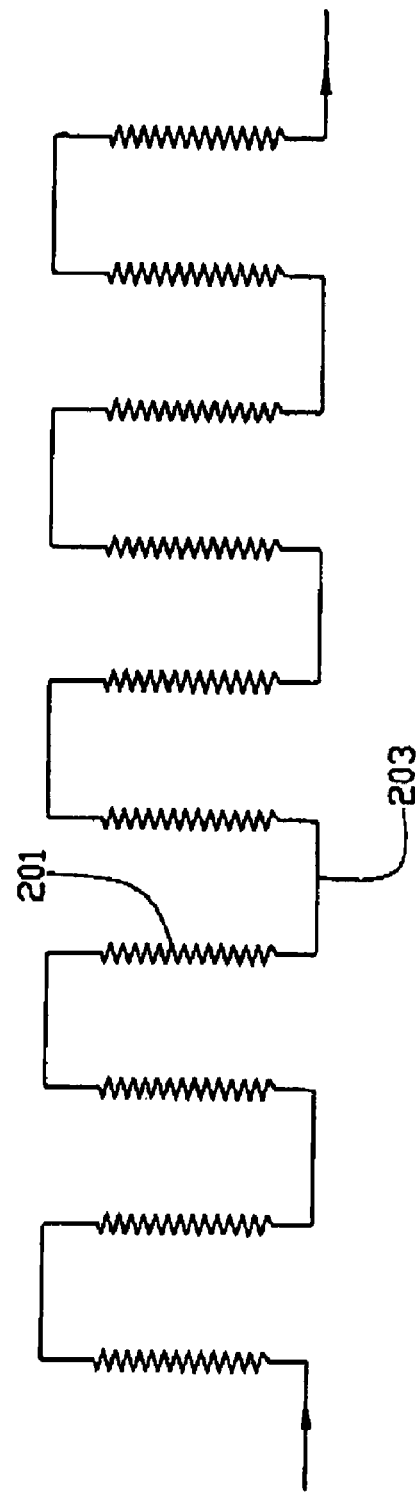
FIG. 6 is a schematic diagram of the connecting micro heating elements of the dynamic FBG of FIG. 3.

Referring to FIGS. 3–6, the dynamic FBG 20 comprises an optical fiber 204 whose index of refraction changes with temperature. One side of a section of the optical fiber 204 is polished into a flat surface 206. A TEC (thermal electric cooler) 202 physically contacts with the flat surface 206. The TEC 202 acts as a heat sink and a temperature controller to maintain that section of the optical fiber 204 at a predetermined temperature. A thin layer of thermal epoxy is applied on the flat surface 206 to ensure good thermal conductivity between the optical fiber 204 and the TEC 202. A plurality of periodically distributed C-shaped micro heating elements 201, with an opening facing the TEC 202, are deposited on an outside surface (not labeled) of the optical fiber 204 by means of deposition or photolithography. The micro heating elements 201 are electrically connected together in series by bonding wires 203, with an end of a micro heating element 201 being wire bonded to a neighboring micro heating element in front of it, while the other end is wire bonded to a neighbor behind it (as shown in FIG. 6). Thus, the same current flows through all the micro heating elements 201 in a zigzag fashion.

When no electrical driving current flows through the micro heating elements 201 of the dynamic FBG 20, the whole section of the optical fiber 204 stays at one temperature (the same as that of the TEC 202), and thus the index of refraction of that section is uniform, and no Bragging Grating effect will affect the incident light. This state is called the "all pass" state. Light input in the port $P_0$ of the circulator 1 reaches the dynamic FBG 20 through the port $P_4$, and all light passes through the dynamic FBG 20 and is output from the port $P_1$.

When an electrical driving current I flows through the micro heating elements 201, each of the micro heating elements 201 generates heat at a constant rate as long as the current I remains constant. Each of the micro heating elements 201 raises the temperature in a tiny cross section of the optical fiber 204 that sits directly beneath the micro heating element 201 and very close to either side of said cross section. The cross sections of the optical fiber 204 that are between the micro heating elements 201 remain at a temperature approximately the same as that of the TEC 202, since the TEC 202 has a much larger contacting area with the optical fiber 204 than the micro heating element 201 do, and since the TEC 202 has a larger heat transfer capacity. Hence, a series of periodically distributed "hot spots" develops along the optical fiber 204 when a current I flows in the micro heating elements 201. Because the index of refraction of materials in a fiber core 205 of the optical fiber 204 changes when temperature changes, a periodic pattern of varying indexes of refraction is generated inside the fiber core 205, with an index of refraction in the hot spots being different from that in the unheated areas. A distance between adjacent two hot spots is the pitch of the dynamic FBG 20, and determines what wavelengths are reflected by the dynamic FBG 20.

Different current values heat up the hot spots to different temperatures, thus causing different change in the indexes of refraction compared with the un-heated areas. A reflection ratio of a dynamic FBG 20 is determined by a difference in adjacent indexes of refraction and by the length of the grating, i.e. distance between a first and a last hot spot. By choosing the temperature of the TEC 202, as well as the length of the grating area, we can design a dynamic FBG in which a driving current $I_{max}$, of reasonable size causes nearly 100% reflection for a wavelength that meets the Bragg condition. This state is called the "all reflect state". In this state, the light input in the port $P_0$ of the circulator 10 reaches the dynamic FBG 20 and is completely reflected by the dynamic FBG 20 to the port $P_3$ of circulator 10, and is then output from the port $P_2$ of the circulator 10.

When the driving current I is larger than zero and less than $I_{max}$, a periodic FBG will be formed and the incident light meeting the bragg condition will be partially reflected and partially passed. Reflected light is output from port $P_2$ of the circulator 10, and passed light is output from the port $P_1$. By varying the driving current, different reflection ratios are achieved. The incident light is split into two beams, a power ratio of which is changed by a change in size of the driving current.

Although the present invention has been described with reference to a specific embodiment, it should be noted that the described embodiment is not necessarily exclusive and that various changes and modifications may be made to the described embodiment without departing from the scope of the invention as defined by the appended claims.

What is claimed is:

1. An optical splitter connecting to an input optical fiber, a first output optical fiber and a second output optical fiber, comprising:
    a circulator comprising an input port connecting to the input fiber, a connecting port, and an output port connecting to the second output fiber; and
    a dynamic fiber bragg grating connecting with the connecting port of the circulator, a reflection ratio of the dynamic fiber bragg grating being controlled by an electrical current flowing in the dynamic fiber bragg grating;
    wherein a light beam input to the circulator through the input fiber transmits to the dynamic fiber bragg grating trough the connecting port of the circulator and dynamically splits into two beams, one beam being reflected by the dynamic fiber bragg grating and being output from the output port of the circulator, and the other beam passing through the dynamic fiber bragg grating and being output through the first output fiber, a power ratio of the two output beams being determined by the reflection ratio of the dynamic fiber bragg grating.

2. The optical splitter in accordance with claim 1, wherein the dynamic fiber bragg grating comprises an optical fiber whose index of refraction changes with temperature.

3. The optical splitter in accordance with claim 2, wherein an outside surface of the optical fiber of the dynamic fiber bragg grating has a cooler attached thereto.

4. The optical splitter in accordance with claim 3, wherein a layer of a thermally conductive material is provided between the cooler and the optical fiber of the dynamic fiber bragg grating.

5. The optical splitter in accordance with claim 3, wherein the optical fiber of the dynamic fiber bragg grating further comprises a plurality of micro heaters defined in a periodic pattern on an outer surface thereof.

6. The optical splitter in accordance with claim 5, wherein the micro heaters each have a C-shape with an opening facing the cooler.

7. The optical splitter in accordance with claim 6, wherein the micro heaters are connected together by a plurality of wires and a current is conducted through the micro heaters.

8. The optical splitter in accordance with claim 5, wherein the micro heaters are defined on the optical fiber of the dynamic fiber bragg grating by means of metal deposition or a photolithography process.

9. A splitter used in optical communication, comprising:
    a circulator; and
    a dynamic fiber bragg grating connected with the circulator and comprising an optical fiber whose refraction index varies with a change in temperature;
    wherein a plurality of micro heaters is defined in a periodic pattern on an outer surface of the optical fiber of the dynamic fiber bragg grating, and each micro heater produces heat to locally heat a section of the optical fiber, so that a light beam input to the dynamic fiber bragg grating is dynamically split into two output beams and a power ratio of the two output beams changes in accordance with a change of a temperature difference between the heated and unheated sections of the optical fiber, and one output beam is reflected by and one output beam is passed trough the dynamic fiber bragg grating.

10. The splitter in accordance with claim 9, wherein the reflected beam is output from a port of the circulator.

11. The splitter in accordance with claim 9, wherein each micro heater is C-shaped and partially surrounds a peripheral section of the optical fiber.

12. The splitter in accordance with claim 11, wherein the micro heaters are defined on the optical fiber by means of metal deposition or a photolithography process.

13. The splitter in accordance with claim 11, wherein a plurality of wires connect the micro heaters together and a current passes through the micro heaters for producing heat.

14. The splitter in accordance with claim 9, wherein one side of the optical fiber is a planar surface and a cooler is attached to the planar surface.

15. The splitter in accordance with claim 14, wherein a layer of thermally conductive material is defined between the cooler and the planar surface of the optical fiber.

16. A dynamic power optical splitter comprising:
    a circulator comprising an input port, a connecting port, and an output port; and a dynamic fiber bragg grating connecting with the connecting port of the circulator, and comprising an optical fiber whose refraction index changes with a change in temperature and a plurality of micro heaters which are defined in a periodic pattern on an outer surface thereof for producing heat;

wherein a light beam transmitted from the circulator to the dynamic fiber bragg grating is divided into two beams, one beam being reflected by the dynamic fiber bragg grating and being output from the output port of the circulator, and the other beam passing through the dynamic fiber bragg grating, a power ratio of the two beams varying in accordance with a reflection ratio of the dynamic fiber bragg grating.

17. The dynamic power optical splitter in accordance with claim 16, wherein a cooler is defined on a surface of the dynamic fiber bragg grating.

18. A dynamic power optical splitter comprising:

a circulator defining first, second and third ports wherein light coming from the first port leaves via the second port and light coming from the second port leaves via the third port; and a dynamic fiber bragg grating connected behind the second port with a fourth port opposite to the second port; wherein said dynamic fiber bragg grating changes a reflection ratio thereof according to an adjustable temperature change thereof so as to obtain different ratios of outgoing power measured respectively at the second port and the fourth port when light comes from the first port.

* * * * *